UNITED STATES PATENT OFFICE.

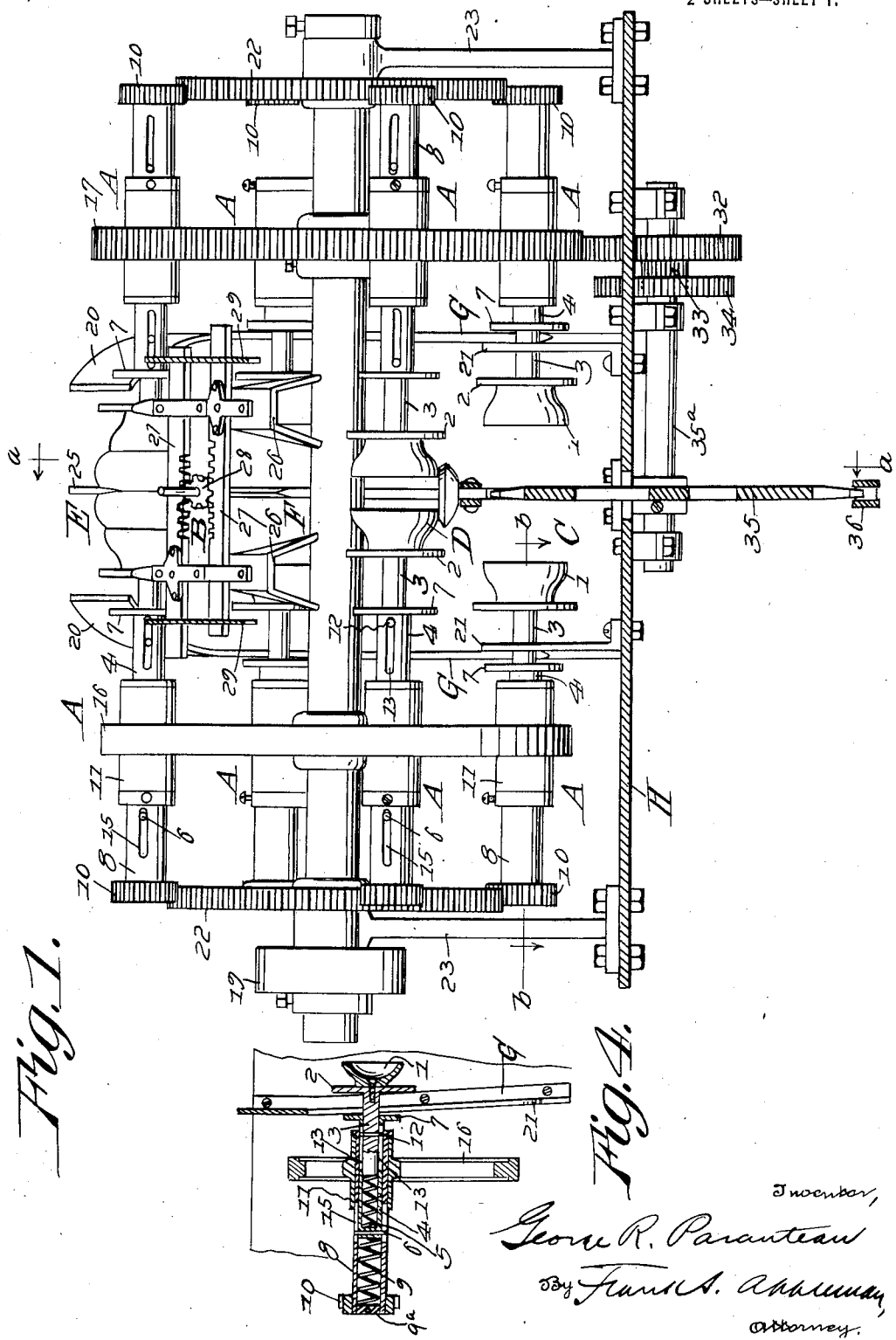

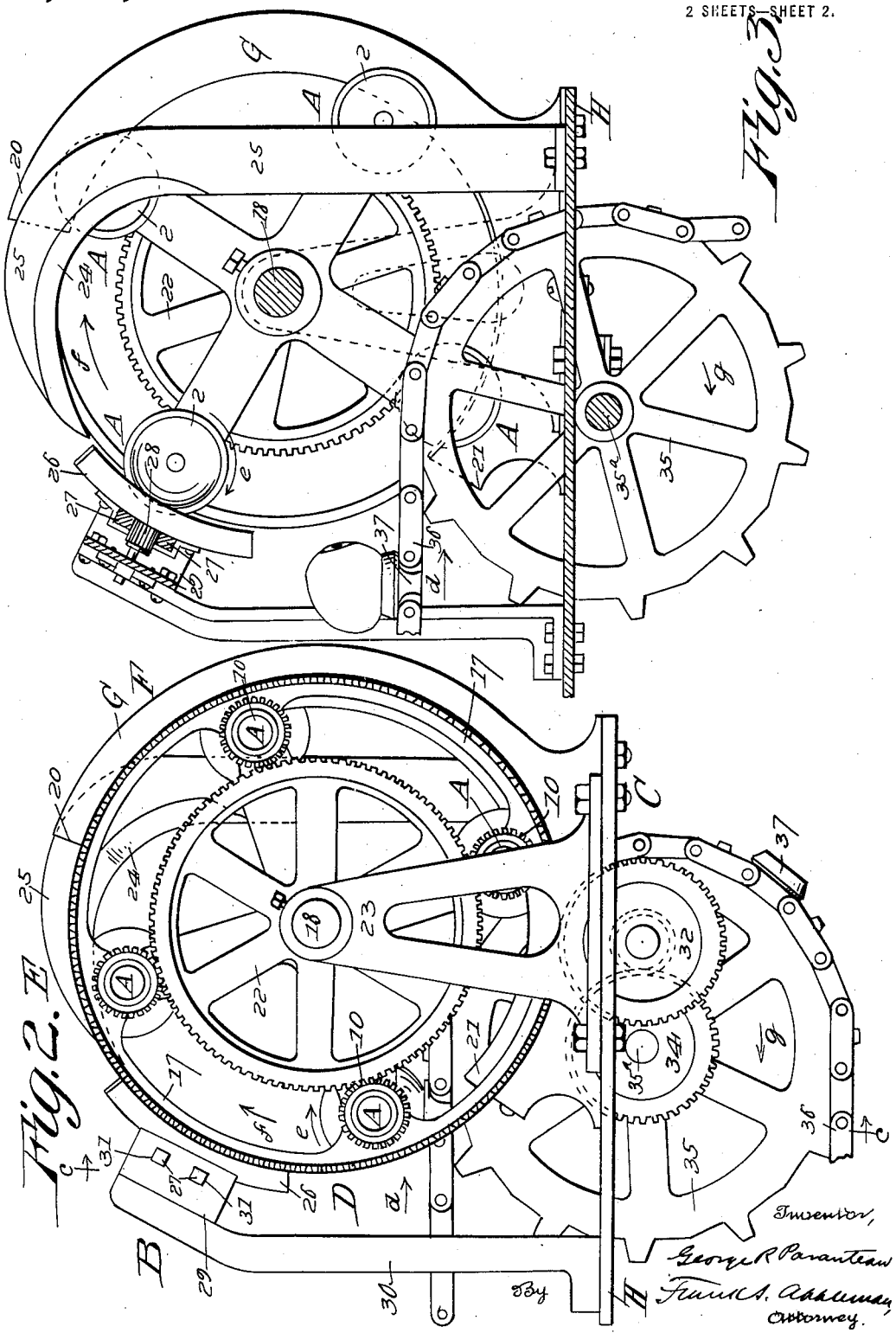

GEORGE R. PARANTEAU, OF SIMI, CALIFORNIA.

FRUIT-PITTING MACHINE. REISSUED

1,392,518.  Specification of Letters Patent.  Patented Oct. 4, 1921.

Application filed September 21, 1920. Serial No. 411,841.

*To all whom it may concern:*

Be it known that I, GEORGE R. PARANTEAU, a citizen of the United States, and a resident of Simi, in the county of Ventura, State of California, have invented a new and useful Fruit-Pitting Machine, of which the following is a specification.

This invention relates to fruit pitting machines and has for its object the provision of novel means for holding fruit to be pitted and carrying it into engagement with a fruit splitting knife which is also operative to arrest the pit to dislodge it from the fruit while the fruit is twisted or partially twisted with relation to the pit to cause a severance of the fiber from the pit.

It is an object of this invention to provide novel fruit engaging elements coacting to hold fruit associated with means for moving the fruit holding elements into such relation to a knife that the knife will engage the fruit at a point midway between the holders and thus insuring that the knife shall engage the fruit at its center and so position the fruit with relation to the knife as to cause the knife to engage the pit and operate most effectively.

It is a further object of this invention to produce novel means for successively retracting the fruit engaging elements and for then releasing them in order that they may be caused to embrace the fruit and carry it into operative relation with the knife.

It is a further object of this invention to provide a fruit carrier capable of delivering fruit one at a time to the holders which coact with the knife for splitting the fruit and removing the two halves thereof from the pit.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a front elevation of a machine embodying the invention with a few of the elements in advance in section;

Fig. 2 illustrates an end elevation;

Fig. 3 illustrates a sectional view on the line *a—a* of Fig. 1; and

Fig. 4 illustrates a sectional view on the line *b—b* of Fig. 1.

In these drawings I have illustrated what might be termed "right and left hand members" identified by the letters A, and except as to slight details of construction as will presently appear, the right hand and left hand members are practically duplicated and corresponding parts of the right hand element coöperate with like parts of the left hand element in carrying fruit and presenting it to a knife in conjunction with which both elements coact.

The machine will be described as having a plurality of fruit carrying members, but it is to be understood that one or such additional numbers or pairs of fruit carrying elements may be employed, and the inventor does not wish to be restricted with respect to the number comprised in a machine.

The invention as embodied in the illustration includes a series of elastic cups 1, each of which has a flange 2 and each said cup is carried by a plunger 3 slidably mounted within a tube 4 which tube contains a spring 5 which bears against the inner end of the tube and against the plunger. A pin 6 extends through the rear end of the tube and operates as a guide therefor, as will presently appear. The tube 4 has a flange 7 and the said tube 4 is slidable in a hollow spindle 8 having a spring 9 therein bearing against the inner end of the tube 4. Each spindle also has a plug 9ª in its end against which the spring 9 bears to hold it under compression. Each hollow spindle 8 has a pinion 10 on the end remote from the cup and each spindle is rotatably mounted in a bearing 11 cast in the wheel 16. A pin 12 extends through the plunger and may slide in the slots 13 of the tube 4 for a purpose to be presently explained. Each spindle 8 has slots 15 therein in which the pin is guided and therefore, each plunger may be free to move inwardly against the action of a spring 5 and each tube may have movement in the hollow spindle against the action of a spring 9.

The wheel 16 which has the bearings is mounted on a shaft 18, and a wheel 17 having a toothed periphery also carries bearings in which hollow spindles are applied for the right hand member of the machine.

The shaft 18 has a pulley 19 for receiving power for driving the shaft, or other suitable power transmitting means may be supplied as a substitute. The shaft is intended to be rotated in the direction of the arrow *f* for carrying the fruit holding elements successively to positions indicated by the letters C, D, E and F, as shown in Figs. 1 and 2. Fig. 3 illustrates the elements or fruit holders in positions in advance of those shown in Fig. 2 by about 50° of rotation, and in Fig. 1, as shown, the positions C and F are the positions in which the cups are open to release fruit previously held in the positions D and E. In other words, the positions D and E are those prior to the time the fruit encounters the knife, whereas the other positions are those in which the fruit has been subjected to the action of the knife and thereafter released from the holders. Guiding bars G are shown as stationed on the frame H and they are curved so that their inner edges are substantially concentric with the wheels 16 and 17 but they are offset laterally to form cams 20 which are effective to move the plungers outwardly or away from the center of the machine after the fruit has passed the knife 25, which is anchored to the base H as fully shown in Fig. 3, an action which results in releasing the fruit held by the cups. The plungers after being fully separated travel in parallel paths until the opposite ends 21 of the guiding bars are reached and then the plungers are released and the springs of the plungers become effective to force the plungers into engagement with fruit carried by the conveyer cups, as will presently appear.

The conveyer includes a sprocket wheel which is rotated in the direction of the arrow *g*, a sprocket chain traveling thereover which travels in the direction of the arrow *d*, the said sprocket chain being provided with a plurality of pockets 37 on which fruit is lodged and carried into position where they may be engaged by the cups. The conveyer wheel 35 is mounted on a shaft 35ª driven by a train of gearing 32, 33 and 34 from the wheel 17, and of course the gearing is so proportioned as to time the conveyer and transfer the fruit carrying pockets 37 under a pair of cups at the time the cups are released from the guiding bar, the said position being indicated by the letter D in Fig. 1.

It is desirable that the central part of the fruit being carried by the cups be presented to the knife, and to that end, a centering mechanism is employed which moves the cups carrying the fruit simultaneously in the same or corresponding directions to the right hand or left hand side and this centering mechanism includes channel members 26 having their outer ends flared and their inner ends converging. The channel members are carried by racks 27 having oppositely disposed teeth which are engaged by a pinion 28 and the said pinion is mounted on a U-shaped plate 29 held in place by the standards 30. The devices on the left hand and right hand members are set to work opposite each other and the cups are intended to hold the fruit midway between them as near as possible, taking into account the irregular shape of the fruit. The cups are rotated or spun in the direction of the arrow *e*, Figs. 2 and 3, while being carried by the wheels 16 and 17 in the direction of the arrow *f*.

The spinning action of the cups presents the fruit to the knife while it is rotating, thus making it possible for the knife to split the fruit and as the fruit is carried beyond the knife, the pit is arrested and separated from the fruit.

The channel members 26, of course, move the spindles as stated and the flanges 2 of the plungers are relied on for engaging the sides of the channel members so that as the cups travel toward the knife, the position of the cups may be shifted to present the substantial center of the fruit to the knife. The racks 27 have guides 31 which are in the sides of the U-shaped plates 29. The channel members 26 are held by reason of their connection with the racks 27 in engagement with the pinion 28 at all times approximately centrally located with respect to the knife 25, while being at the same time free to move in either direction toward or away from each other in equal degrees each, and hence fruit of different sizes may be accommodated. No alternative movement is allowed the racks and they must move in synchronism. In other words, an inward movement of one and an outward movement of the other at the same time will not be permitted, but they must move together inwardly or outwardly. An outward movement is understood as being a movement away from the center between the channels and by inward movement is meant a movement toward the center. The centralized position of the channel members 26 is seen to be always maintained through the action of the racks and pinion, and therefore, the flanges 2 of the fruit holders in passing through the channels must be centralized by such passing and the cups 1 with the fruit held likewise centralized with respect to the knife as required.

It is believed unnecessary to supply a résumé of the operation of the device since a description of the operation of the elements and their coaction with other elements has been stated in connection with a description of the elements.

I claim:

1. In a fruit pitting machine, rotatably mounted wheels in spaced relation to each other, fruit carrying members carried by the wheels, the fruit carrying element of one wheel being oppositely disposed with relation to the fruit carrying element of the other wheel, each of the said fruit carrying elements comprising a cup, a plunger carrying the cup, means for urging the plunger outwardly, means for rotating the plunger, means for pressing the plunger inwardly against the action of the means for urging the plunger outwardly, a knife in position to engage fruit between the cups as the cups are carried, and means for guiding the coacting cups in a right hand or left hand direction.

2. In a fruit pitting machine, a shaft, wheels mounted thereon in spaced relation to each other, a fruit engaging element carried by one of the wheels, a fruit engaging element carried by the other wheel opposite the first mentioned fruit engaging element, the said fruit engaging elements being adapted to coact for carrying fruit, each of the said fruit engaging elements comprising a cup, a plunger carrying the cup, means for yieldably holding the plunger in operative relation to the wheel which carries it, a guide for each plunger having a camming surface for moving the plunger inwardly against the action of the spring, a conveyer having fruit carrying elements operative to deliver fruit between the two coacting cups, a knife in the path of travel of fruit carried by the fruit engaging cups in their rotation, means for imparting rotary motion to the fruit engaging cups when carried by the wheels, and means for centering the fruit held by the cups with relation to the knife.

3. In a fruit pitting machine, rotatably mounted wheels in spaced relation to each other, fruit engaging members carried by the wheels, the fruit engaging members of one wheel being oppositely disposed to that carried by the other wheel and adapted to coact with each other for holding and carrying fruit, each of said fruit engaging elements including a cup for embracing the fruit, means for yieldingly supporting the cup with relation to the wheel, means for rotating the cup as the wheel travels, a knife in the path of travel of fruit carried by the cups, and means for moving the cups for centering the fruit with relation to the knife.

4. In a fruit pitting machine, rotatably mounted wheels, fruit grasping members carried by the wheels, the fruit grasping member of one wheel being movable toward and away from the fruit grasping member of the other wheel, means for yieldingly maintaining the grasping members in operative relation to each other, means for rotating the wheels, and means for simultaneously shifting the fruit grasping members in corresponding directions.

5. In a fruit pitting machine, rotatably mounted wheels, yieldable and coacting fruit grasping members carried thereby, means for guiding the said fruit grasping members laterally of the machine in the same direction simultaneously, means for coupling the guiding means whereby they work in unison, and means for rotating the wheels.

6. In a fruit pitting machine, fruit grasping elements, means for carrying the fruit grasping elements, a conveyer operative to convey fruit in the path of travel of the fruit grasping elements, whereby the said fruit grasping elements will move fruit from the conveyer, means for mounting the fruit grasping elements yieldably, whereby they move toward and away from each other, means for centering the fruit carried by the fruit grasping elements, and a knife in the path of travel of fruit held by the fruit grasping elements.

7. In a fruit pitting machine, fruit grasping elements, means for yieldingly mounting the fruit grasping elements in opposed relation to each other for coaction one with the other, means for simultaneously carrying the fruit grasping elements, and means for moving the fruit grasping elements in the same direction simultaneously transversely.

8. In a fruit pitting machine, fruit grasping elements, means for yieldingly mounting the fruit grasping elements in opposed relation to each other for coaction one with the other, means for simultaneously carrying the fruit grasping elements, means for moving the fruit grasping elements in the same direction simultaneously transversely, and a knife in the path of travel of fruit carried by the said fruit grasping elements.

9. In a fruit pitting machine, fruit grasping elements, means for yieldingly mounting the fruit grasping elements, means for carrying the fruit grasping elements in opposed relation to each other for coaction one with the other, guides for moving the fruit grasping elements simultaneously in one direction or the other transversely of the machine, means on each fruit grasping element for engaging a guide, and means for communicating the motion of one guide to the other guide.

10. In a fruit pitting machine, fruit grasping elements, means for yieldingly mounting the fruit grasping elements, means for carrying the fruit grasping elements in opposed relation to each other for coaction one with the other, guides for moving the fruit grasping elements simultaneously in one direction or the other transversely of the machine, means on each fruit grasping element for engaging a guide, means for communicating the motion of one guide to the other, means for urging the fruit grasping elements normally toward each other, and means for pressing the fruit grasping elements apart.

11. In a fruit pitting machine, yieldable coacting fruit grasping members, means for moving the said members into operative relation with a knife, and means for simultaneously shifting the fruit grasping members in corresponding directions.

12. In a fruit pitting machine, fruit grasping members arranged in pairs, means for carrying the fruit grasping members of a pair in unison, means for simultaneously rotating the fruit grasping members of each pair, and means for simultaneously shifting the fruit grasping members in corresponding directions axially.

In witness that I claim the foregoing I have hereunto subscribed my name this 3 day of July, 1920.

GEORGE R. PARANTEAU. [L. S.]

Witnesses:
E. E. EVERETT,
JOSEPH M. ARGABRITE.